July 15, 1969  D. J. DADDONA, JR., ET AL  3,454,994
WAISTBAND FASTENER
Filed April 28, 1967

United States Patent Office 3,454,994
Patented July 15, 1969

3,454,994
WAISTBAND FASTENER
Domenic J. Daddona, Jr., Waterbury, and Hugh H. Andrews, Cheshire, Conn., assignors to Scovill Manufacturing Company, Waterbury, Conn., a corporation of Connecticut
Continuation-in-part of application Ser. No. 468,884, July 1, 1965. This application Apr. 28, 1967, Ser. No. 634,550
Int. Cl. A44b 17/00
U.S. Cl. 24—224
4 Claims

ABSTRACT OF THE DISCLOSURE

An improved waistband fastener uses a stud element like a common snap fastener on one side and a keeper or socket element on the other side, made of sheet metal and secured by an anchor plate. Indentations in the socket element provide camming means to make the stud snap into place and prevent accidental unfastening. The socket has broad base portions contacting the fabric so that the prongs which secure it have their wide faces presented in such a direction as to take the tearing stress.

---

This invention relates to waistband fasteners particularly adapted for fastening the waistband of trousers.

This application is a continuation-in-part of Ser. No. 468,884, filed July 1, 1965 and now abandoned. No prior art closer than the citations in that application is known to applicants.

Among the objects of the invention is to provide a waistband fastener which can be economically manufactured, and to this end, one of the components is a modified form of snap fastener stud element while the other component consists of a sheet metal socket or keeper element, and a sheet metal anchor plate. Such parts not only can be economically produced but also are adapted for attachment to the garment by machines.

Other objects of the invention are to produce a waistband fastener which will be useful for work clothing, and to this end, the parts must be so constructed as to resist the pressures encountered in the laundering of such garments; to provide improved means for preventing accidental opening of the fastener; to provide improved retention means for keeping the stud in the socket without offering undue resistance to insertion or removal of the stud.

Other objects and advantages hereinafter will more fully appear.

In the drawings, we have shown for purposes of illustration one embodiment which the invention may assume in practice. In the drawings.

Figure 1:
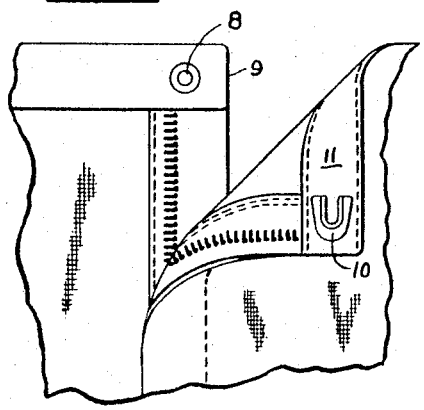
FIG. 1 shows a portion of a pair of trousers provided with our improved fastener.

As shown in FIG. 1, the stud element generally designated 8, is attached to the front face of the waistband material 9 on one side of the garment while the socket or keeper component, generally designated 10, is attached to the inner face of the overlapping waistband material 11 on the other side of the garment.

The stud element consists of a circular base flange 12, a neck 13 and a bulbous head 14 of substantially larger diameter than the neck. This construction is similar to a common form of snap fastener stud, except that the head 14 is somewhat more flattened to provide a sharper shoulder 15 between the head and the neck. Also, the flange is cupped or concave, except for a narrow flat rim 16.

The stud is attached by a common form of post member 17 which is cupped so as to be complementary to the shape of the flange 16, and again, the flat rim section 18 will prevent cutting of the garment material.

The stud receiving socket consists of a sheet metal frame or plate 19 having a U-shaped elevated portion presenting side flanges 20 and 21 and a closed end section 22 joined to the plate 19 by inclined walls 23. These walls are made as steep as feasible in ordinary manufacturing operations.

Figure 2:
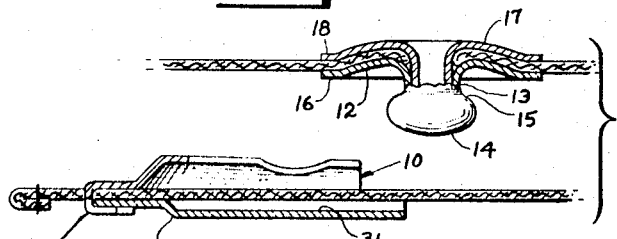
FIG. 2 is a view mostly in section of the stud component and socket element when separated.
Figure 3:
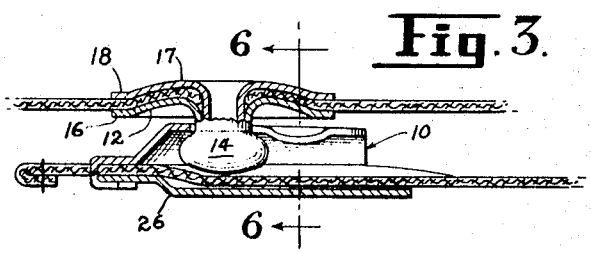
FIG. 3 is a similar section through the socket component and stud element assembled.
Figure 4:
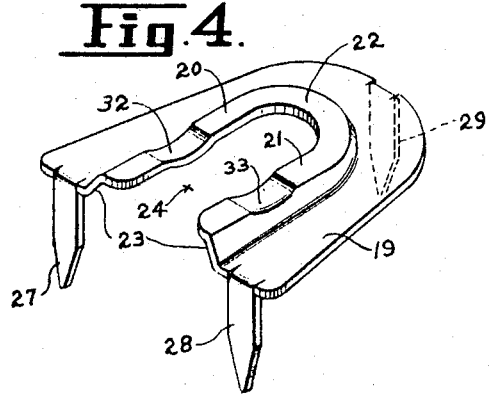
FIG. 4 is a perspective view of the socket or keeper element.

It will also be noted in FIGS. 2 and 3 that there is a slight incline of this elevated portion so as to provide a somewhat deeper pocket near the closed end 22. This serves the purpose of presenting the strongest portion of the elevated section to the pressing machine so that less of the force will come on the relatively weak portions of the flanges 20 and 21. It also serves to make a better pocket for the stud head 14.

The central slot 24 in the elevated portion of the socket element is of such width that it will freely receive the neck 13 of the stud but, of course, will prevent removal of the stud head through the slot except at its open end. The socket element 19 is arranged so that the closed end of the slot is toward the outer edge of the waistband 11 while the open end may be termed the inner end.

Figure 6:
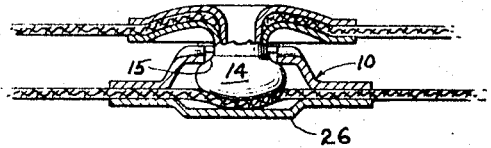
FIG. 6 is a cross-section on line 6—6 of FIG. 3.
Figure 5:
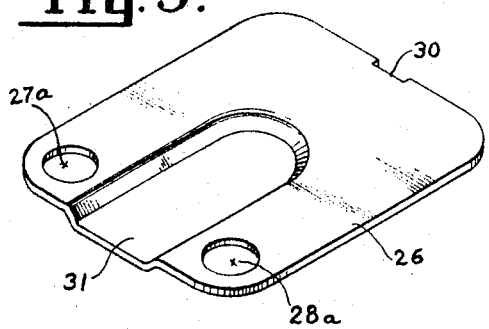
FIG. 5 is a perspective view of the anchor plate.
Figure 7:
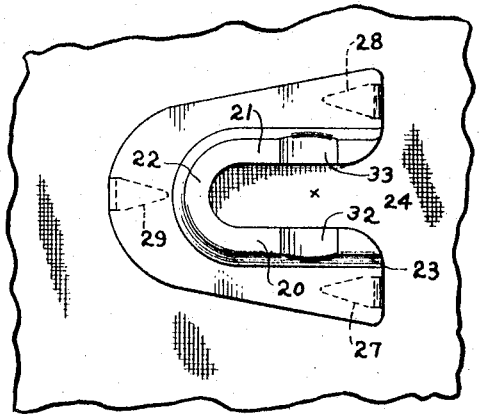
FIG. 7 is a plan view of the socket assembled on a garment.

On the opposite side of the section 25 of the waistband material is the anchor plate 26 and the socket element is held in place by prongs 27 and 28, which extend through holes 27a and 28a in the anchor plate and the prong 29 engaging in a notch 30. The base portions of the anchor plate which contact the fabric are relatively wide so that the wider faces of the prongs 27 and 28, as well as the prong 29, extend transversely of the direction of the slot 24 so as better to resist tearing out the supporting material. All of the prongs are bent over or clinched against the anchor plate so as to hold the socket in place. The anchor plate has a closed bottom recess 31 which is preferably made by forming the central section of the plate outwardly, and this recess is in alignment with the 24 so that the stud may push the garment material of the section 25 into the recess as seen in FIGS. 3 and 6. By providing this recess, the elevated portion of the socket need not be so high and thus it contributes to the over-all thinness of the fastener. Also, the material pushed out to form the recess 31 will provide a flat surface for engagement with a pressing machine to prevent any concentration of pressure on the clinched-over prongs 27, 28 and 29.

In order to more securely retain the stud from accidental movement out of the slot, there are provided camming means located between the open and closed ends of slot 24 to provide sufficient resistance so as to give in effect a snap action when the stud rides over the camming means. For this purpose, the indentations 32 and 33 in the elevated sections 20 and 21 on opposite sides of the slot 24 produce curved projections to engage the shoulder 15 of the stud head as it passes into the socket or out of the socket. These projections have sloping surfaces facing both the open and closed ends of the slot 24 so that accidental withdrawal of the stud is reliably prevented, while at the same time, no undue force is required in fastening or unfastening.

It will also be noted that the cupping or doming of the base flange 12 of the stud element brings its rim 16 closer to the surface of the elevated portion of the socket element. This is an important feature in reducing the amount of rocking or tilting action between the socket and the stud when the parts are fastened together.

What we claim is:

1. A waistband fastener having on one side of the garment
   (a) a stud with a base flange bearing against the garment, a neck extending centrally from said flange and a bulbous head of substantially larger diameter than said neck;
   (b) means for securing said stud to the garment;
   (c) on the other side of the garment, a stud-receiving socket consisting of a plate having a base bearing against one face of a section of the garment material, a U-shaped elevated portion integrally joined to said base by inclined wall portions, said elevated portion providing an elongated slot closed at the outer end and open at the inner end to receive said stud, said slot being of such width that it will freely pass the neck of the stud while retaining the stud head under said elevated portion;
   (d) an anchor plating bearing against the opposite face of said section of garment material and having a bottom recess in alignment with said slot, the height of said stud being sufficient to extend beyond said socket base so that it may push the garment material of said section into said recess;
   (e) prongs extending from said socket and clinched over said anchor plate; and
   (f) camming means between the open and closed ends of said slot in the path of said stud and over which said stud must pass to move fully into said slot or out of said slot.

2. A fastener as defined in claim 1 wherein said camming means consists of indentations in said elevated portion of the socket to provide inwardly projecting portions on either side of said slot, which have sloping surfaces facing opposite ends of said slot.

3. A fastener as defined in claim 1 wherein said elevated portion of the socket element is inclined from the open end to the closed end so as to provide a deeper stud-receiving pocket adjacent said closed end and also to locate the section of greatest height at the strongest part of said elevated portion.

4. A fastener as defined in claim 1 wherein that portion of the socket base on either side of said slot is of substantial width and wherein said prongs have their wider surfaces extending transversely of the direction of said slot.

References Cited

UNITED STATES PATENTS

| | | | |
|---|---|---|---|
| 609,512 | 8/1898 | Leblanc | 24—217 |
| 846,678 | 3/1907 | Martinez | 24—224 |
| 988,558 | 4/1911 | England | 24—224 |
| 1,363,367 | 12/1920 | Snyder | 24—224 |
| 1,420,177 | 6/1922 | Beemer | 24—224 |
| 2,866,246 | 12/1958 | Waldes | 24—226 |
| 948,837 | 2/1910 | Wickersham. | |
| 1,330,426 | 2/1920 | Bishop. | |
| 1,406,390 | 2/1922 | Jasgur. | |
| 2,651,093 | 9/1953 | Lynch. | |

FOREIGN PATENTS

| | | |
|---|---|---|
| 66,897 | 12/1893 | Germany. |
| 373,496 | 4/1923 | Germany. |
| 15,992 | 1884 | Great Britain. |
| 58,906 | 1912 | Switzerland. |
| 17,228 | 1902 | Great Britain. |

DONALD A. GRIFFIN, Primary Examiner